Jan. 17, 1950     W. C. VIZARD     2,494,786
BEADED WELTING
Filed March 26, 1949
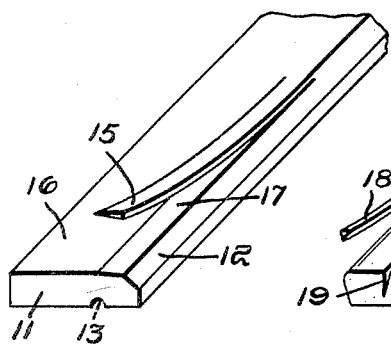
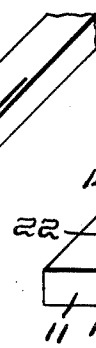
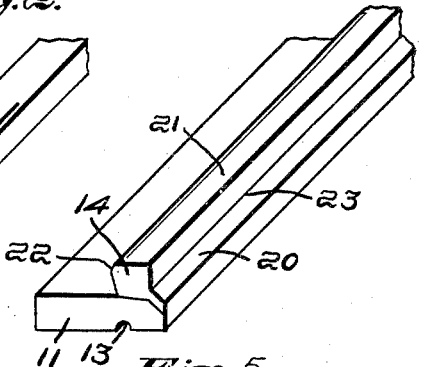
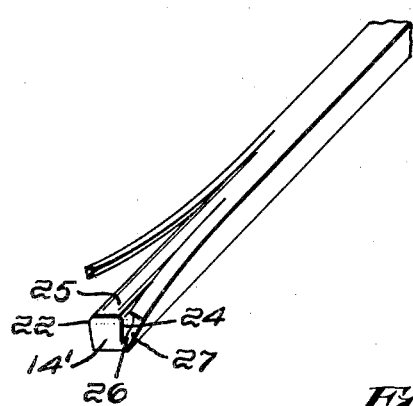
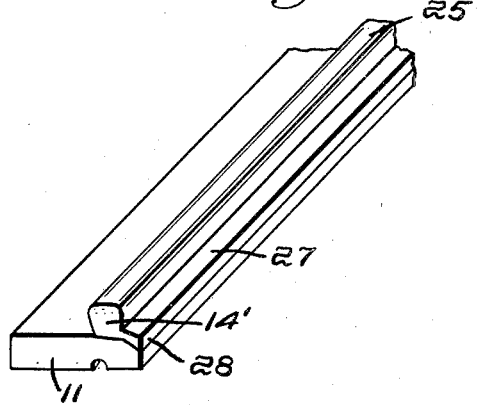
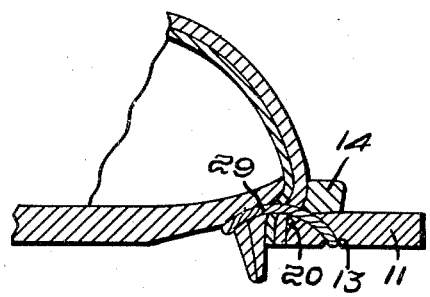
Inventor:
William C. Vizard,
by Thomson & Thomson
Attorneys Patented Jan. 17, 1950

2,494,786

UNITED STATES PATENT OFFICE 2,494,786

BEADED WELTING

William C. Vizard, Brockton, Mass., assignor to Barbour Welting Company, Brockton, Mass., a copartnership Application March 26, 1949, Serial No. 83,659

3 Claims. (Cl. 12—146)

This invention relates to the manufacture of beaded welting and pertains more particularly to improvements in methods of making two-unit shoe welting having an upstanding bead adjacent its inner edge to engage the upper of a shoe and thereby prevent grinning of the same and the admission of water or moisture to the seam.

The principal purpose of the invention is to produce, by simple and economical methods and from relatively inexpensive material, a satisfactory beaded welting made from a standard strip of Goodyear welt, as a base unit, and a small strand of grain leather, as a bead unit, in such a way that the welt extension and the top of the bead of the assembled welting present grain surfaces. The economies effected by producing a beaded welting in accordance with this improvement are substantial as compared with the cost of making conventional types of beaded welting heretofore produced; and the resulting product is more flexible and easier to build into a shoe than welting heretofore made with a grain surface extending completely over the welt extension, the bead and the inseam edge.

Recommended embodiments of the invention are shown in the accompanying drawings, in which:

Fig. 1 is a perspective view of a strip of standard Goodyear welt, conventionally beveled and grooved, showing the removal of a thin and narrow ribbon from the grain side of the strip adjacent the beveled edge;

Fig. 2 is a perspective view of a relatively small strip of grain leather, showing the chamfering of a small rand from one corner of the grain edge, and the formation of a vertical slit through the grain surface to provide a flexible lip at the opposite edge of the strip;

Fig. 3 is a perspective view of the two-unit beaded welting, assembled from the strips of Figs. 1 and 2;

Fig. 4 is a view similar to Fig. 2 showing a modified form of slit in the small welt strip;

Fig. 5 is a view similar to Fig. 3, showing the beaded welting assembled from the strips of Figs. 1 and 4; and Fig. 6 is a fragmentary transverse section through the toe portion of a lasted shoe, showing the application of the improved welting, in building the shoe.

In the form chosen for the purpose of illustration in Figs. 1 to 3, the beaded welting is produced from a strip of standard Goodyear welting 11, beveled at 12 and grooved at 13 in accordance with common practice; and a small strip of grain leather 14 which is substantially square in cross section. The Goodyear welting 1 of Fig. 1 is of standard dimensions approximately ½" wide and ⅛" thick, and constitutes the base unit of the improved welting. The small strip 14 of Fig. 2 is ⅛" thick, and preferably has a width of 3/32" on its upper or grain face and a width of 4/32" on its lower or flesh face. The strip 14 may be of scrap stock or a byproduct of a fillet of grain leather used for other purposes.

In accordance with this invention, a relatively thin, beveled ribbon 15, approximately 1/32" thick at its outer edge and 3/32" wide is skived from the grain surface 16 of the welt strip, adjacent the bevel 12, to provide a roughened surface band 17 to which the bead unit may be cemented as hereafter described. The smaller strip 14, constituting the bead unit is chamfered or rounded along one corner of its grain top by removing a small rand 18; and a vertical incision 19 is cut through the grain surface adjacent and parallel to the opposite edge of the strip. The cut 19 is preferably made approximately 3/32" from the unchamfered edge of the strip, and is preferably 3/32" deep. This incision forms a thin and flexible lip 20.

The cut 19 is next spread open by bending the lip 20 downwardly along the flexible grain hinge beneath the apex of the incision, and the flesh base of said strip is then cemented to the top of the base unit 11, with the outer face of the lip 20 cemented to the bevel 12 of the base unit, as shown in Fig. 3. The assembled welting may be pressed and molded to bond the units together and thereby provide an improved beaded welt in which the base unit presents the grain extension 16 and the bead unit 14 has a grain surface 21 along its top and a rounded corner 22 along its outer edge. The beveled edge of the base unit and the lip 20 bonded thereto provide a composite inseam flange of flesh material which is relatively flexible and easily receives an inseam stitch passing through the groove 13 and the crevice or channel 23 formed by spreading the slit 19, as shown in Fig. 6.

In the modified forms shown in Figs. 4 and 5, the incision in the bead strip 14' starts with a chamfer cut 24 at the grain top of the strip, thereby forming a rounded shoulder 25 along the inner top corner of the strip, to correspond with the rounded shoulder 22 along the outer top corner as above described. The cut is then directed downwardly at 26, in the same manner as the cut 19. The flexible lip 27, thus formed, presents a thicker outer edge 28 which slightly increases the edge thickness of the inseam flange, when the modified bead unit is applied to the base unit 11, substantially as above described and as shown in Fig. 5.

Beaded welting made in accordance with this invention is inseamed to the shoe as shown in Fig. 6, and outseamed in a conventional manner. The inseam stitch 29 passes through the relatively thin portion of the composite inseam flange, between the groove 13 and the crease 23, as above indicated. Inasmuch as the improved welting is made from a standard Goodyear welt strip which is regularly made by and available to welt manufacturers, and from a small, substantially square strip of grain leather which may consist of scrap material also available to the welt manufacturer, the cost of production is substantially less than the cost of manufacture of the usual types of beaded welting heretofore available. Furthermore, as the composite inseam flange consists entirely of flesh stock, it is relatively flexible and easier to bend when inseaming or outseaming the beaded welting, in making a shoe. Ornamental stitching may be applied to the top of the bead by sewing through the bead unit, or through both the bead unit and base unit, after assembly.

I claim:

1. A method of making two-unit beaded welting, which consists in skiving a relatively thin and narrow ribbon from the grain surface of a standard, beveled Goodyear welt strip, adjacent the beveled edge thereof, to provide a base unit having a roughened band on its top surface along said edge; making a deep, vertical incision through the top grain surface of a leather strip of substantially rectangular cross-section adjacent and parallel to one edge of said strip, to produce a flexible lip; spreading said incision to bend the lip downwardly, thereby providing a bead unit; and cementing the base of the bead unit and the outer face of said lip to the roughened band and beveled edge, respectively, of said base unit.

2. A method of making two-unit beaded welting, which consists in skiving a relatively thin and narrow ribbon from the grain surface of a standard, beveled Goodyear welt strip, adjacent the beveled edge thereof, to provide a base unit having a roughened band on its top surface along said edge; making a deep, vertical incision through the top grain surface of a leather strip of substantially rectangular cross-section, adjacent and parallel to one edge of said strip, to produce a flexible lip; chamfering the grain surface at the opposite edge of said strip to provide a rounded corner along the top of said opposite edge; spreading said incision to bend the lip downwardly, thereby providing a bead unit; and cementing the base of the bead unit and the outer face of said lip to the roughened band and beveled edge, respectively, of said base unit.

3. A method of making two-unit beaded welting, which consists in skiving a relatively thin and narrow ribbon from the grain surface of a standard beveled Goodyear welt strip, adjacent the beveled edge thereof, to provide a base unit having a roughened band on its top surface along said edge; making a deep vertical incision through the top grain surface of a leather strip of substantially rectangular cross-section, adjacent and parallel to one edge of said strip, to produce a flexible lip; chamfering at the time of making said incision the grain corner of said strip opposite said lip; and chamfering the grain corner at the opposite free edge of said strip, to provide a bead having rounded corners along both its top edges; spreading said incision to bend the lip downwardly, thereby providing a bead unit; and cementing the base of the bead unit and the outer face of said lip to the roughened band and beveled edge, respectively, of said base unit.

WILLIAM C. VIZARD.

No references cited.